(12) United States Patent
Kurulay

(10) Patent No.: US 12,633,729 B2
(45) Date of Patent: May 19, 2026

(54) ELECTRICAL TRANSFORMATION SUBSTATION

(71) Applicant: UNARETI S.P.A, Brescia (IT)

(72) Inventor: Erkul Kurulay, Istanbul (TR)

(73) Assignee: UNARETI S.P.A., Brescia (IT)

( * ) Notice: Subject to any disclaimer, the term of this patent is extended or adjusted under 35 U.S.C. 154(b) by 268 days.

(21) Appl. No.: 18/572,279

(22) PCT Filed: Jun. 30, 2022

(86) PCT No.: PCT/IB2022/056100
§ 371 (c)(1),
(2) Date: Dec. 20, 2023

(87) PCT Pub. No.: WO2023/281363
PCT Pub. Date: Jan. 12, 2023

(65) Prior Publication Data
US 2024/0291247 A1 Aug. 29, 2024

(30) Foreign Application Priority Data
Jul. 5, 2021 (IT) ......................... 102021000017669

(51) Int. Cl.
H02B 7/06 (2006.01)
H02B 1/20 (2006.01)
(Continued)

(52) U.S. Cl.
CPC ................. H02B 7/06 (2013.01); H02B 1/20 (2013.01); H02B 1/46 (2013.01); H02B 1/56 (2013.01); H02B 15/00 (2013.01)

(58) Field of Classification Search
CPC ... H02B 7/06; H02B 7/08; H02B 1/20; H02B 1/04; H02B 1/56; H02B 15/00; H02B 1/46; E04H 5/04
See application file for complete search history.

(56) References Cited

U.S. PATENT DOCUMENTS

| | | | | |
|---|---|---|---|---|
| 7,352,564 B2 * | 4/2008 | Courtney | ................. | H02B 7/06 361/620 |
| 8,054,628 B2 * | 11/2011 | Carsten | .................... | H02B 7/06 361/603 |

(Continued)

FOREIGN PATENT DOCUMENTS

| | | | | | |
|---|---|---|---|---|---|
| CN | 211480700 U | * | 9/2020 | ............... | H02B 7/06 |
| CN | 214850040 U | * | 11/2021 | ............... | H02B 7/06 |

(Continued)

OTHER PUBLICATIONS

International Search Report and Written Opinion for PCT/IB2022/056100 dated Oct. 25, 2022, 14 pages.

(Continued)

*Primary Examiner* — Robert J Hoffberg
(74) *Attorney, Agent, or Firm* — Duane Morris LLP

(57) ABSTRACT

An electric power transformation substation includes a containment box including first, second and third box compartments. The box compartments define a respective compartment and are arranged adjacent to one another in a longitudinal direction when the substation is in a position of use, the second box compartment being arranged between the first and third box compartment. Medium-voltage switchgear is in the first box compartment. An electrical power transformer in the second box compartment converts a medium-voltage power into low-voltage power. Low-voltage switchgear is in the third box compartment. The containment box includes a box bottom wall which, in the position of use lies on a support surface, a box upper wall, first and second box side walls, and box front and rear walls. The first side wall and the second box side wall laterally delimit the first box compartment and the third box compartment, respectively.

15 Claims, 10 Drawing Sheets

(51) Int. Cl.
    *H02B 1/46*         (2006.01)
    *H02B 1/56*         (2006.01)
    *H02B 15/00*       (2006.01)

(56) References Cited

U.S. PATENT DOCUMENTS

| | | | | |
|---|---|---|---|---|
| 8,198,966 | B2 * | 6/2012 | Thrue | E04H 5/04 |
| | | | | 52/27 |
| 9,265,162 | B2 * | 2/2016 | Kang | H05K 5/0226 |
| 10,461,510 | B2 * | 10/2019 | Lee | H02B 1/308 |
| 10,992,115 | B2 * | 4/2021 | Yin | H02B 1/305 |
| 11,575,248 | B2 * | 2/2023 | Jiang | H02B 7/06 |
| 2008/0225467 | A1 * | 9/2008 | Thrue | H02B 7/06 |
| | | | | 361/603 |
| 2009/0213531 | A1 * | 8/2009 | Berggren | H02B 7/06 |
| | | | | 361/603 |
| 2021/0091543 | A1 * | 3/2021 | Yin | G09F 13/04 |

FOREIGN PATENT DOCUMENTS

| | | | | | |
|---|---|---|---|---|---|
| CN | 115395416 | A | * | 11/2022 | H02B 1/565 |
| CN | 116526347 | A | * | 8/2023 | H02B 7/06 |
| CN | 116632689 | A | * | 8/2023 | H02B 1/46 |
| CN | 117856071 | A | * | 4/2024 | H02J 7/00 |
| DE | 2230689 | A | * | 6/1974 | H02B 1/505 |
| DE | 4310290 | A1 | * | 10/1993 | E06B 7/082 |
| DE | 19650931 | A1 | * | 6/1998 | H02B 7/06 |
| DE | 19954993 | A1 | | 5/2001 | |
| DE | 29624387 | U1 | * | 12/2002 | E04H 5/04 |
| DE | 102010035269 | A1 | * | 3/2012 | H01F 7/0231 |
| DE | 202025102131 | U1 | * | 7/2025 | E04H 5/04 |
| EP | 0196624 | A2 | * | 10/1986 | H02B 13/025 |
| EP | 1435681 | A1 | * | 7/2004 | H02B 7/08 |
| EP | 1439622 | A1 | | 7/2004 | |
| EP | 1962396 | A2 | | 8/2008 | |
| EP | 3263803 | A1 | * | 1/2018 | E04H 5/04 |
| EP | 4137656 | A1 | * | 2/2023 | E04H 5/04 |
| EP | 4300734 | A1 | * | 1/2024 | H02B 7/06 |
| FR | 2518833 | A1 | | 6/1983 | |
| FR | 2881001 | A1 | * | 7/2006 | H02B 7/06 |
| JP | S57118606 | U | | 7/1982 | |
| JP | 2002078112 | A | | 3/2002 | |
| JP | 2002238112 | A | | 8/2002 | |

OTHER PUBLICATIONS

Office Action issued for Japanese Patent Application No. 2024-500547 dated Oct. 14, 2025, 13 pages.

* cited by examiner

ELECTRICAL TRANSFORMATION SUBSTATION

BACKGROUND AND SUMMARY OF THE INVENTION

The present invention relates to an electrical transformation substation, in particular to an electrical transformation substation configured to be connected to an electrical power distribution network, more specifically a medium voltage/ low voltage (MV/LV) electrical transformation substation. Electricity distribution generally refers to the phase of supplying electricity from a high-voltage transmission system, typically from 130 kV up to 700 kV, to end users. An electricity distribution network typically carries electricity via medium-voltage and/or low-voltage power lines.

Medium voltage, typically between 1 and 30 kV, is used in sections of the intermediate distribution network with transformation substations that receive high-voltage energy from the transmission system and feed medium-voltage distribution power lines. Such transformation substations are often referred to as substations or primary substations. In a distribution network for residential users, e.g. residential or commercial units, a plurality of secondary transformation substations are typically connected to the primary distribution lines, where the secondary substations perform a "second" transformation from medium voltage energy to low voltage energy (less than 1000 V, e.g. 230 V or 400 V) for the end users. Therefore, a MV/LV transformation substation comprises the set of devices dedicated to transforming the voltage supplied by the medium-voltage distribution network into voltage values suitable for supplying low-voltage lines. Typically, a secondary substation comprises one or more MV/LV transformers, MV and LV switching apparatuses, MV and LV switchgear and/or connections, and auxiliary devices, such as MV protection devices on the utility distribution side and LV protection devices on the user side.

Although the network is managed, as far as energy flow is concerned, in a radial manner, in order to achieve greater flexibility in electricity distribution, meshed distribution networks are created, in which a secondary substation can receive energy from one of several primary substations, so that a redundancy of power lines is created and thus the possibility of creating alternative routes in the event of an interruption of energy supply from a primary or secondary substation, thus increasing the reliability of the system.

In a rural context, secondary substations are normally located at ground level and built in a prefabricated construction.

Typically, a secondary substation can serve several hundred low-voltage consumers. Electricity distribution in highly urbanised areas often involves a very large number of substations, in the order of several thousand. Particularly in an urban context, a secondary substation is usually built in a hollow space below ground level, normally within a masonry-built technical compartment, often belonging to the building or group of buildings served. The volume of the technical compartment and the placement of equipment inside it are usually such that access is guaranteed to authorised technical personnel. In addition, the space inside the technical compartment must take into account sufficient spacing between the equipment to allow for natural cooling of the electromagnetic components and the laying of connecting cables between the low and high voltage sections. In typical layouts, the volumetric space required in a technical compartment for a secondary substation has a plan area of 15-20 m² and a height of 2.5-3.0 metres.

The Applicant has noted that in many urban contexts where the need for an increasing number of new transformation substations (e.g. 50 to 100 substations/year) is expected, it becomes increasingly complex to identify new underground spaces with the necessary volume. In addition, access to the secondary substation in an underground technical compartment within large underground civil works or buildings is usually via driveway grates or removable slabs. Access therefore requires authorised personnel to descend into a confined space with the risk of injury and therefore the need for more articulated interventions involving multiple field workers and/or personal protective equipment.

The Applicant has considered that the provision of an electrical transformation substation that does not require physical access inside the substation for the control and management of the electrical lines and electrical/electro-magnetic components, at least for the majority of ordinary operations by technical personnel, would allow a significant reduction in the volumetric occupancy associated with the substation.

This disclosure relates to an electrical energy transformation substation comprising:

a containment box extending along a longitudinal direction and comprising a first box compartment, a second box compartment and a third box compartment, wherein the first, second and third box compartment define a respective compartment and are arranged adjacent to one another in a longitudinal direction when the substation is in a position of use, the second box compartment being arranged between the first and third box compartment;

a medium-voltage switchgear arranged in the first box compartment;

an electrical power transformer configured to convert a medium-voltage power into a low-voltage power and arranged in the second box compartment, and a low-voltage switchgear arranged in the third box compartment, wherein the containment box comprises a box bottom wall which, in the position of use, lies on a support surface, a box upper wall opposite the box bottom wall, a first and second box side walls opposite to one another, a box front wall and a box rear wall opposite the box front wall, and the first side wall and the second box side wall laterally delimit the first box compartment and the third box compartment, respectively.

Preferably, the containment box is made of metal.

Preferably, the containment box has a generally parallel-epiped shape.

The upper and lower box walls extend in the longitudinal direction along the first, second and third box compartments.

The containment box has a length L along the longitudinal direction.

The box walls (bottom, top, first side, second side, front and rear) define an internal volumetric space of the substation. The interior volumetric space includes first, second and third compartments corresponding to the first, second and third box compartments.

Preferably, the first box compartment and the third box compartment are separated longitudinally from the second box compartment.

Preferably, the containment box comprises a main box frame comprising a plurality of mounting bars or tubes forming a frame structure, the frame structure defining the partition of the internal volumetric space into the three box compartments.

Preferably, the first and third box compartments are separated from the second box compartment by respective first and second partition walls that extend vertically from the back wall of the box so as to separate the compartments of the respective box compartments.

Preferably, the first and second partition walls extend vertically from the back wall of the box to the top wall of the box.

Preferably, the partition walls are made of metal.

Preferably, the containment box comprises a plurality of removable box wall sections, e.g. opening doors or removable panels, for access to each of the box compartments.

Preferably, the box front wall comprises a first removable wall section at the second box compartment and the first side wall or the front wall comprises a second removable wall section to access the first box compartment, the substation further comprising a third removable wall section arranged on the front wall at the third box compartment or on the second side wall.

Preferably, the first, second and third removable wall section are watertight when in a respective closed position.

Preferably, the second removable wall section is placed on the first side wall.

Preferably, the third section of removable box wall is placed on the front wall at the third box compartment.

Preferably, the second removable wall section for access to the first box compartment is arranged in the first side wall.

The Applicant has understood that if the electrical substation is underground and is in communication with the outside environment at an upper portion of the substation accessible from the outside, control and/or manoeuvres to change the grid configuration can take place via a control panel that acts as a user interface and can be in communication with a supervisory and control system of the electrical substation.

Preferably, the substation comprises an electronic control panel positioned within the substation at a compartment of one between the first, second and third box compartment, wherein, in the position of use of the electrical substation, the upper wall is accessible from the outside and comprises an inspection opening and the electronic control panel is arranged at and near the inspection opening so as to be accessible from the outside through the inspection opening.

Preferably, the electronic control panel is operatively connected to a supervisory and control system of substation data comprising data relating to the operation and functioning of the medium-voltage switchgear, the low-voltage switchgear and the electrical power transformer.

Preferably, the control panel comprises a human-machine interface configured to display substation data and/or to enter commands executable by the supervisory and control system.

In ordinary operations, the electrical substation can be supervised from the outside by accessing the control panel located at the top of the electrical substation to display operational and operating parameters, more generally substation data. Ordinary manoeuvres, such as a change of position of electrical switching elements, circuit breakers or line disconnectors, to prevent or allow current to flow through low or medium voltage lines, can be controlled and managed via the control panel. These manoeuvres can also take place via a remotely transmitted command.

In general and in accordance with the common understanding of the term, a switching apparatus will be referred to as a device capable of assuming more than one state, typically two or three states, for example closed or open on the line and possibly grounding, in particular capable of performing the manoeuvres necessary to open or close a circuit, for example dividing a section of power line from/to a secondary substation.

Preferably, the electronic control panel is placed in the space of the first or third box compartment, close to the inspection opening.

Preferably, the supervisory and control system is of a centralised type and includes the ordinary functions of control, adjustment/modification of physical devices in the substation, and monitoring by means of data acquisition, control and management.

The supervisory and control system may comprise or consist of a SCADA (Supervisory Control And Data Acquisition) module. Preferably, the supervisory and control system comprises a module for receiving and transmitting data remotely and in communication with a telecommunications network. The transceiver module can be located within the SCADA module or in communication with it. The transceiver module can be configured to communicate with a wired telecommunications network, a mobile network (i.e. via radio frequency signals) or a WLAN in communication with a mobile network. Thus, alternatively or additionally, access to and control of substation data can be performed remotely.

Advantageously, the transformation substation in accordance with the present disclosure allows for the control and routine operation of the electrical installations contained therein under safe conditions, either remotely (in the case of remote actuation of controls) or on site by an operator outside the substation.

Preferably, the substation data supervisory and control system is housed in an electronic module, the electronic module comprising inputs and outputs for operational connection to the electronic control panel.

Preferably, the electronic control panel and electronics module are located inside the compartment of the first box compartment, above the medium-voltage switchgear.

Preferably, the electronics module is arranged in a vertical direction with respect to the longitudinal box direction between the control panel and the medium-voltage switchgear.

Preferably, the electronics module is equipped with inputs and outputs for operational connection to a distribution network supervisory and management system for the management of electricity distribution, the electronics module being connected to the distribution network supervisory and management system.

Preferably, the human-machine interface is logically connected to one or more user-activated input devices (e.g. mouse, touch-screen, keyboard, etc.).

Preferably, the inspection opening is provided with a protective cover which is removable or can be opened, the protective cover being watertight when in a closed position of the inspection opening.

Preferably, the protective cover is fitted with a watertight sealing gasket.

If it is necessary to inspect the inside of the electrical substation, e.g. to carry out maintenance work on electrical and/or electromagnetic components, the substation can be lifted and removed from the space in which it was placed and brought above ground.

The above-ground level is a level accessible to an operator and can be the ground level, when the substation is buried in the external environment, or the surface of a basement or underground part of a building.

Due to the small size of the electrical substation and the arrangement of equipment and components, no internal maneuvering space is required for the operator. The electrical equipment is within the operator's reach and can be easily repaired, removed or replaced without the need for the operator to physically enter the substation.

The Applicant has noted that the provision of a forced-circulation cooling system in the transformation substation would allow for temperature control in the substation as well as a general reduction of the volumetric space inside the substation.

Preferably, the electrical substation comprises a forced-air cooling system comprising a first air intake and a first air extraction device, the first air intake and the first air extraction device being arranged outside the substation on the upper box wall and in communication with the inside of the containment box.

Preferably, the first air intake for the first air extraction device are arranged at respective openings formed in the upper wall at the second box compartment.

Preferably, the cooling system comprises a second air intake and a second air extraction device which are arranged outside the substation on the upper box wall, at respective openings in the upper wall, wherein the second air intake is arranged at the first or third box compartment and the second extraction device is arranged at the third box compartment if the second air intake is arranged at the first box compartment or at the first box compartment if the second air intake is arranged at the third box compartment.

Preferably, the cooling system is ductless.

Preferably, each of the first and second box partition wall includes one or more openings.

Preferably, the one or more openings of the first and second partition walls are arranged close to the upper box wall.

Preferably, the low-voltage switchgear comprises a plurality of low-voltage input-output switches and the power transformer is electrically connected to the plurality of input-output switches by means of a busbar structure configured to transport low-voltage energy.

Preferably, the busbar structure comprises a plurality of input busbars connected to respective inputs of the plurality of input-output switches and a respective plurality of output busbars connected to respective outputs of said plurality of input-output switches.

The electrical connection by means of a busbar structure allows an additional space saving inside the substation by increasing its compactness.

Preferably, the second box side wall is provided with a plurality of through-holes designed for inserting low-voltage energy cables for the connection to busbars of the plurality of output busbars.

Preferably, the low-voltage switchgear is placed on the back wall of the containment box.

Preferably, the low-voltage switchgear is placed near the rear wall of the box.

Preferably, the medium-voltage switchgear is arranged on the box bottom wall at the first box compartment and the box bottom wall comprises two or more respective through-holes configured for the passage of respective medium-voltage cables from outside the substation and from below the box bottom wall for connection to the medium-voltage switchgear.

Preferably, the substation is equipped with at least one medium-voltage substation cable connecting the medium-voltage switchgear to the power transformer on the transformer side facing the first box compartment. At least one medium-voltage substation cable has a first and a second cable end, the first cable end being connected to the medium-voltage switchgear and the second cable end being connected to the power transformer.

Preferably, the at least one substation medium-voltage cable passes through a respective at least one through-hole formed in the box bottom wall at the first box compartment for the connection of the first cable end with the medium-voltage switchgear, and the at least one substation medium-voltage cable which exits from below the box bottom wall has a path that runs outside the substation to enter the substation again from below through an opening in the box bottom wall arranged at the second box compartment to enter the substation and connect the second end of the substation cable to the power transformer.

Preferably, the medium-voltage switchgear comprises an outer casing that comprises a base arranged on the box bottom wall at the first box compartment. The base of the outer casing comprises one or more through-holes arranged at one or more respective through-holes in the box bottom wall.

Preferably, the power transformer is a three-phase transformer comprising three single-phase transformer units.

Preferably the at least one substation medium-voltage cable for the connection between the medium-voltage switchgear and the power transformer is a three-phase cable, whose electrical phases are carried on three separate energy cables.

Preferably, the medium-voltage power cables of the distribution system into and out of the transformation substation are three-phase cables, whose electrical phases are carried on three separate cables.

Although a main use of the electrical substation in accordance with this disclosure may be in an urban context where the substation is underground or partially underground, it is not excluded that the substation may also be installed outdoors in an urban context or in a rural context where less space is required.

BRIEF DESCRIPTION OF THE DRAWINGS

Further features and advantages will result from the detailed description of some exemplary embodiments of an electrical transformation substation in accordance with the present invention. Such description will be set forth herein below with reference to the accompanying figures, provided for merely indicative and therefore non-limiting purposes, wherein.

DETAILED DESCRIPTION

Figure 1:
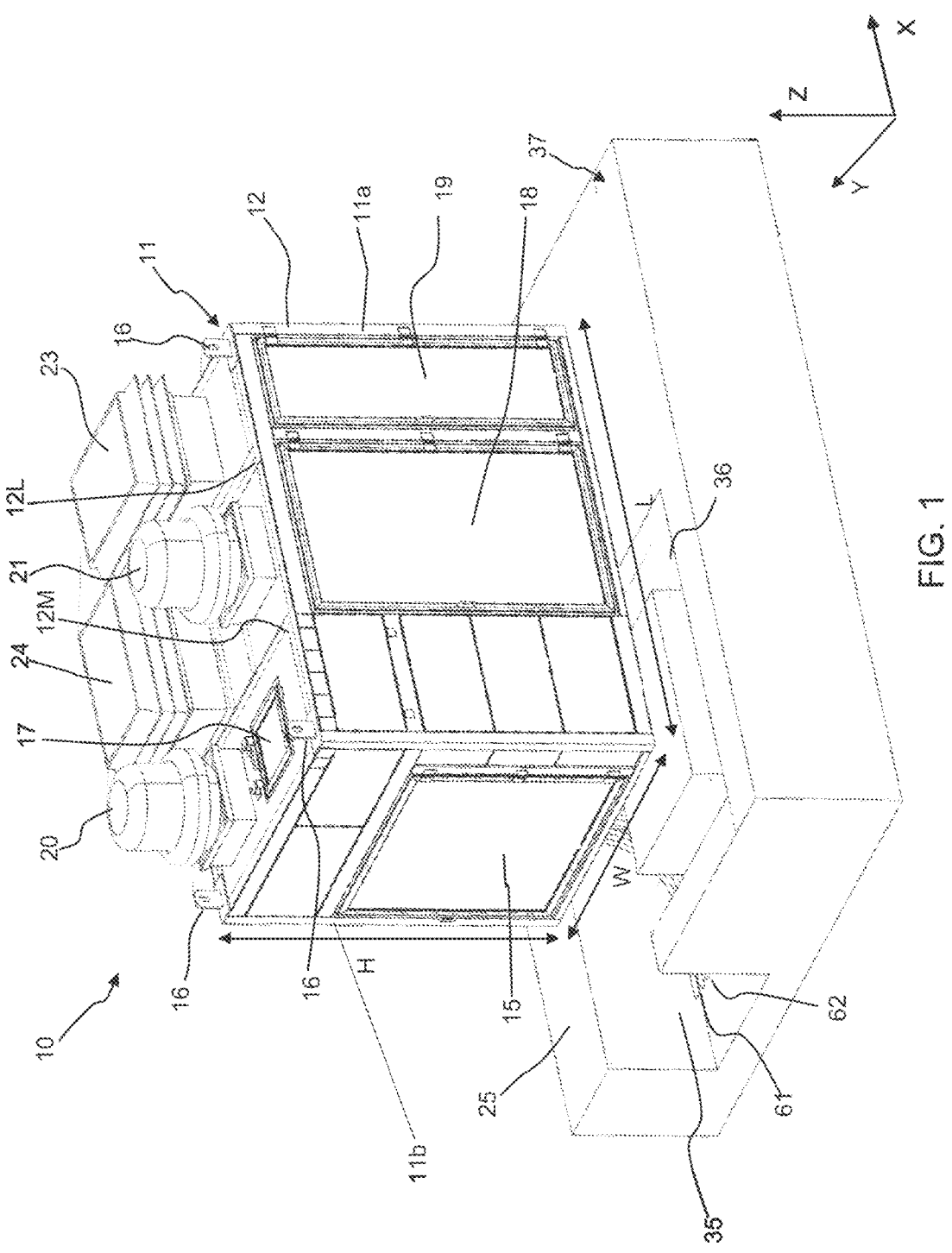
FIG. 1 shows a perspective view of an electrical transformation substation in accordance with an embodiment.

With reference to the figures, reference number 10 indicates an electrical transformation substation, which in the present example is an MV/LV transformation substation, specifically a secondary substation which, in an operational condition, is connected to an electrical power distribution network.

The substation 10 rests, at least for most of its extension, on a support surface 25 which may be the bottom surface of an excavation in the ground, the surface of a floor of a basement room of a building or more generally the surface of a masonry work on which the substation is placed. The support surface 25 on which the substation 10 lies is for convenience defined as extending on a horizontal plane. In the example illustrated, the support surface 25 is the upper surface of a masonry work 37.

The substation 10 includes a containment box 11 that encloses equipment and components described with reference to the following figures. The box 11, generally parallelepiped in shape and having 6 sides, has a length L along the longitudinal direction X, a depth W (Y axis) and a height H (vertical axis or vertical direction Z), shown in FIG. 1. The containment box 11 has a front wall 11*a*, a first side wall 11*b* (FIG. 1), a rear wall 11*f* opposite the front wall 11*a* (shown in FIG. 2), a second side wall 11*d*(FIG. 3), an upper wall 11*c* (FIG. 2) and a bottom wall 11*e* (shown in FIG. 3) lying on the support surface 25.

In an operational condition, the containment box 11 is buried or partially buried and its upper wall 11*c* comprises a free surface accessible from the outside.

The terms "top", "side", "lower" and "bottom" used to describe the relative positions of the components of the electrical substation, in particular the walls of the containment box, refer to a condition of use and/or operation of the secondary substation. Furthermore, the term "wall" refers to one side of the containment box and may be a single piece or comprise or consist of removable portions of wall, such as removable doors or panels that, typically in the case of maintenance or internal inspection of the substation, allow an operator access to equipment housed inside the containment box.

The box 11 provides a partition of its interior space into respective spaces, indicated below, with compartments or volumes, for housing the medium voltage, transformer and low voltage sections. The containment box 11 comprises three box compartments 31, 32, 33 that extend along the length L of the box. The box compartments are contiguous with each other and consist of a first box compartment 31, a second box compartment 32 and a third box compartment 33 (FIG. 2), each box compartment defining a respective compartment. The first box compartment 31 is also referred to hereafter as medium voltage compartment or MV compartment; the second box compartment 32 is also referred to as transformer compartment, and the third box compartment 33 is also referred to as low voltage compartment or LV compartment.

Figure 2:
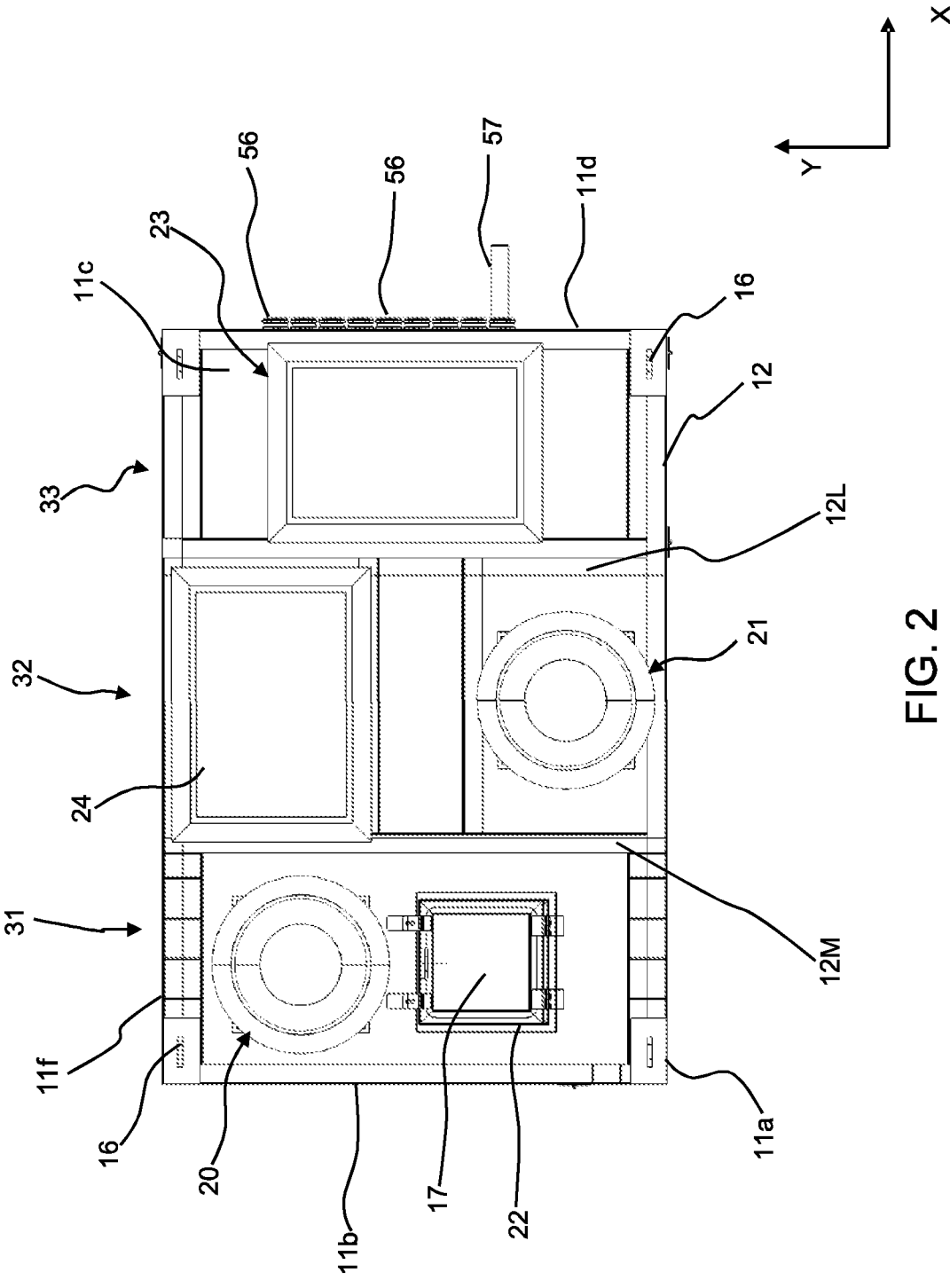
FIG. 2 is a top view of the electrical substation of FIG. 1.
Figure 3:
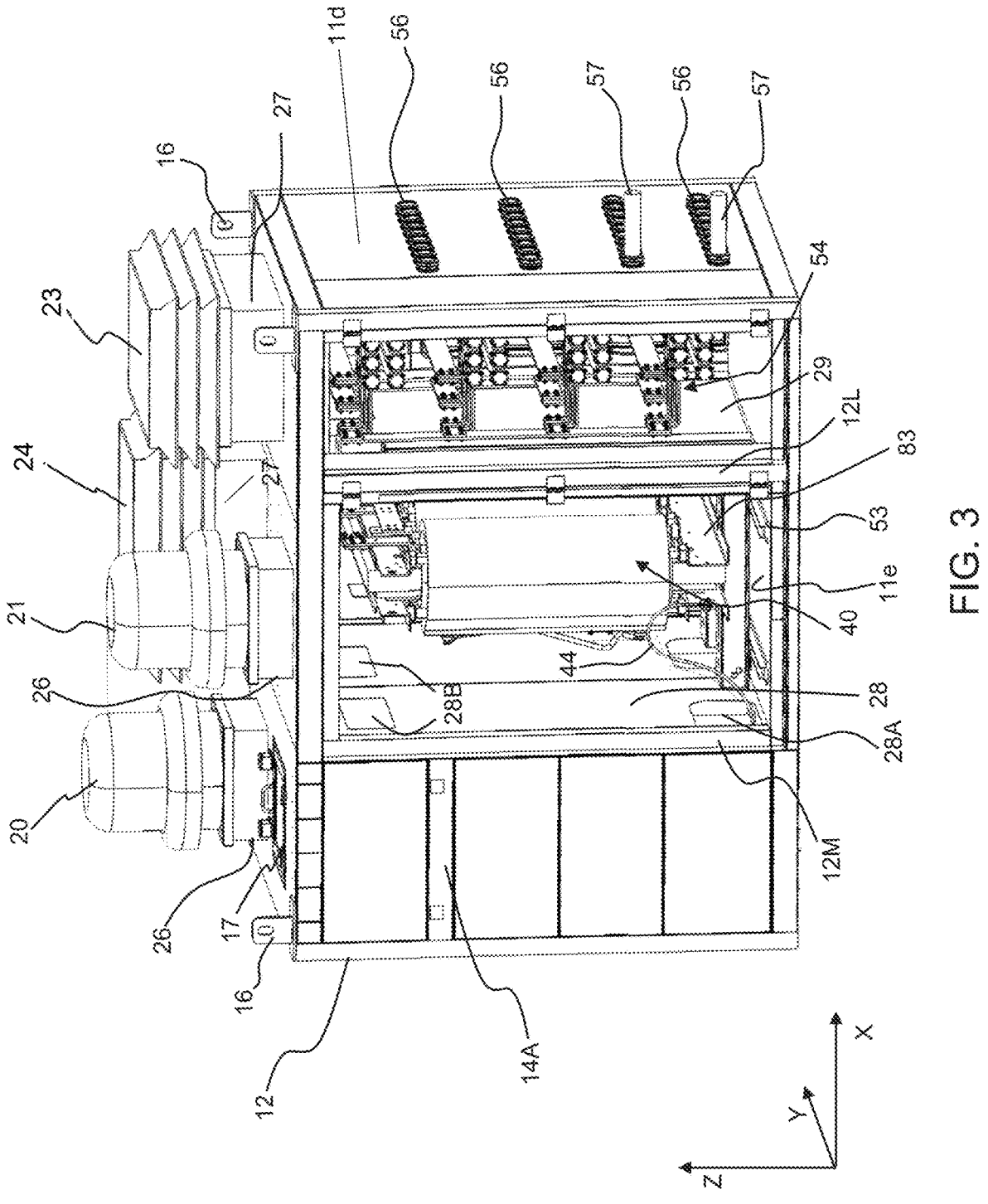
FIG. 3 is a front perspective view of the electrical substation of FIG. 1, in which the box wall sections 18, 19 have been removed to partially show the inside of the substation.

In the embodiment of the figures, the box comprises a main metal frame 12 (FIGS. 1-3). The main box frame 12 is generally rectangular parallelepiped-shaped and comprises a plurality of mounting bars or tubes, for example of galvanised steel, welded together to form a frame structure. The frame structure 12 defines the partition of the internal box volume into the three box compartments 31, 32, 33.

The transformer box compartment 32 is arranged between the MV compartment 31 and the LV compartment 33. Portions of frame 12M and 12L that extend vertically with respect to the support surface 25 of the substation 10 mark the extension of the MV and LV compartments 31 and 32 in the length L of the substation 10 (FIGS. 1 and 2).

Preferably, MV and LV box compartments 31, 33 are separated from the transformer box compartment 32 by respective partition walls 28 and 29 arranged at the frame portions 12M and 12L (FIG. 3).

Preferably, the partition walls 28, 29 extend vertically along the entire height of the internal volume of the box 11. Preferably, the partition walls 28, 29 are made of metal, e.g. steel.

Preferably and as described below, each of the partition walls 28, 29 separating the box compartments of the electrical substation 10 include one or more openings (throughholes).

The physical separation between the box compartments makes it possible to keep the rooms inside the substation 10 separate in the event of maintenance or installation by third parties. In addition, the provision of metal partition walls between the substation compartments creates a Faraday cage that prevents electromagnetic interference and increases safety by protecting the MV and LV compartments 31, 33 from possible partial discharges.

Figure 5:
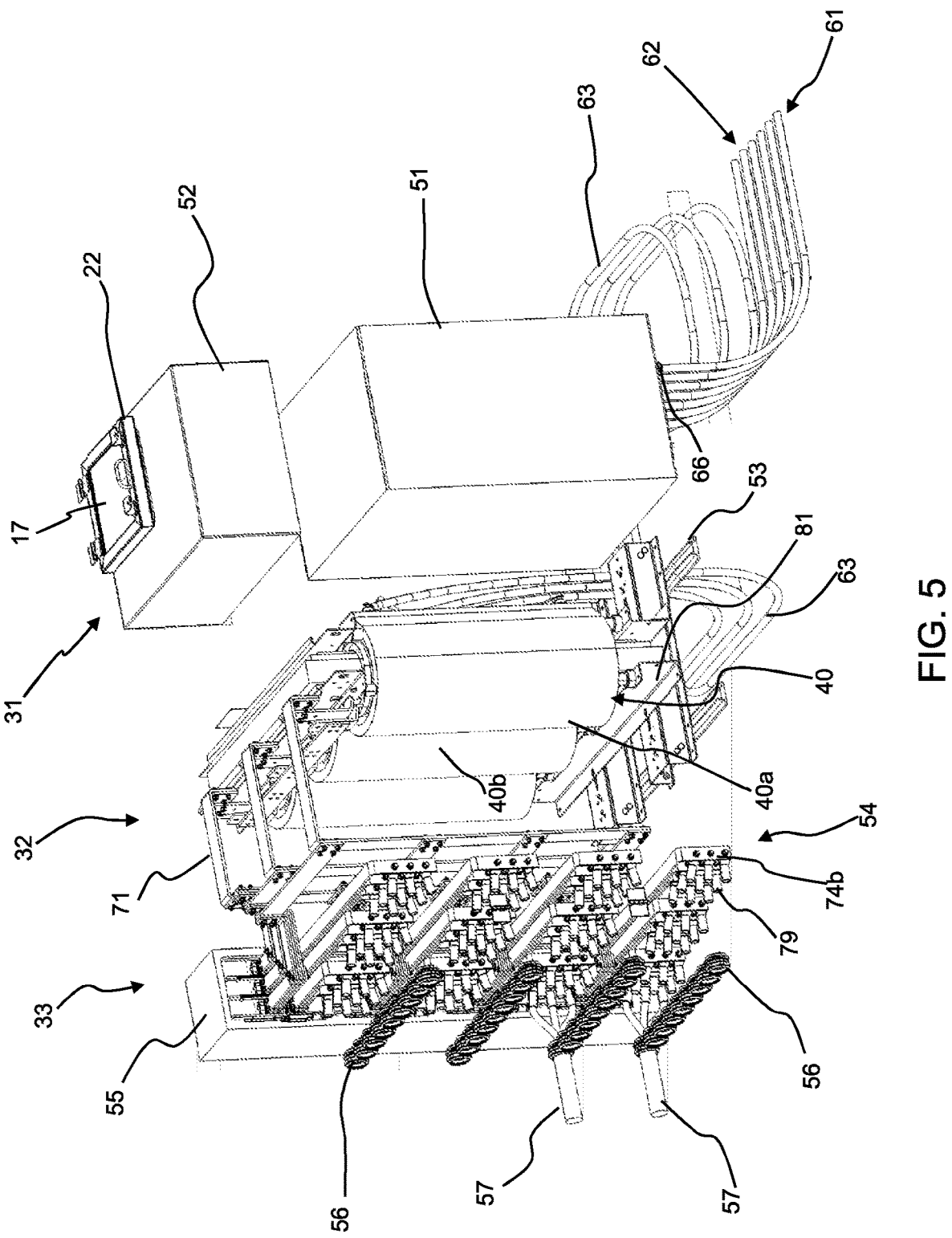
FIG. 5 is a rear perspective view showing the main components installed in the electrical substation. To show some details more clearly, the containment box has been removed.

The side wall 11*d* of the containment box 11 at the LV compartment 33 is provided with a plurality of throughholes into which respective cable grommets 56 are fixed for the insertion of low-voltage energy cables, as described in more detail below. In the non-limiting example illustrated in the figures, several sub-pluralities of cable grommets 56 are arranged in parallel rows. The cable grommets 56 can be mechanically connected to a disconnectable terminal (not shown) for the insertion of LV cables 57 (FIGS. 3 and 5).

The box 11 comprises a plurality of removable box wall sections 15, 18, 19, e.g. doors that can be open or removable panels (in the illustrated example doors openable outward), for access to each of the box compartments 31, 32, 33 of the substation 10. In the example of the figures, a removable wall section 15 for access to the MV box compartment 31 is arranged on the first side wall 11*b* of box 11, while wall sections 18, 19 for access to the transformer compartment 32 and to the LV compartment 33, respectively, are arranged on the front side 11*a*.

The containment box 11 is preferably made of a watertight material to prevent the inlet of liquids, e.g. possible water seepage from the surrounding soil. More generally, the containment box is sealed to the outside for good or perfect water tightness. Always in order to ensure watertightness, the removable box wall sections are made, in known ways, to be watertight when in the closed position.

The main frame 12 may include at least two wing hooks 16 integral with the frame structure 12 for installing the electrical substation in a basement compartment and lifting it up to ground level or to the basements of a building, e.g. in the case of maintenance or repairs. In the embodiment shown in the figures, four wing hooks 16 are arranged in the frame at the upper wall 11c of the substation. The hooks can of course have a different shape and/or structure.

In another embodiment (not shown), there are no lifting hooks and the substation can be moved vertically by a lifting system.

With reference to FIG. 3, the electrical transformation substation 10 comprises an electrical power transformer 40 configured to convert the input voltage to a lower level voltage, in particular to convert medium voltage power to low voltage power. The transformer 40 is arranged in the transformer box compartment 32. In general, the size of the transformer depends on the electrical power required, which typically ranges from 300 to 1000 KVA in a secondary substation, smaller powers allowing for a more compact and space-saving design. By way of non-limiting example, in the embodiment illustrated in the figures, transformer 40 is a three-phase transformer comprising three single-phase transformer units 40a, 40b, 40c mechanically connected to each other by means of metal bars 45 (visible in FIG. 6) and mounted on a base frame 81 (FIGS. 3, 6-8). In the usual way, the transformer 40 is connected to earth via an earth cable 44 (FIG. 3).

In one embodiment, the transformer 40 is a dry-type MV/LV distribution transformer, preferably with MV and LV windings pre-impregnated or encapsulated in resin.

Preferably, the transformer 40 is installed in the transformer compartment 32 in such a way that it can be removed from the substation and be accessible for maintenance or repair. For this purpose, the transformer is mounted, via the base frame 81, on a bidirectional roller guide 82 (rollers partially visible in FIG. 6). In the example illustrated, the roller guide 82 comprises a pair of metal profiles 82a fixed at the top of the base frame 81 of the transformer, each metal profile 82a being configured to engage one or more sliding rollers. In the example in the figures, the base frame 81 is hooked onto the pair of metal profiles 82a of the roller guide. The roller guide 82 is arranged on a sliding rail 53 fixed to the bottom wall 11e of the containment box, e.g. the sliding rail is welded or bolted to the lower side of the box. The sliding rail 53 comprises one or two guide rails (two rails in the figures) extending in the front-to-back direction of the substation 10. The contact between the roller guide 82 and the guide rails 53 is through the rollers, which are configured to travel along the guide rails. The rollers can be made of or externally coated with non-conductive polymeric material so that there is no electrical conduction between the transformer 40 and the containment box 11 in the event of electrical leakage. Other constructions and configurations for the extraction of the transformer are of course possible and may vary depending on the configuration of the transformer used and/or the internal spaces of the transformer box compartment.

Figure 6:
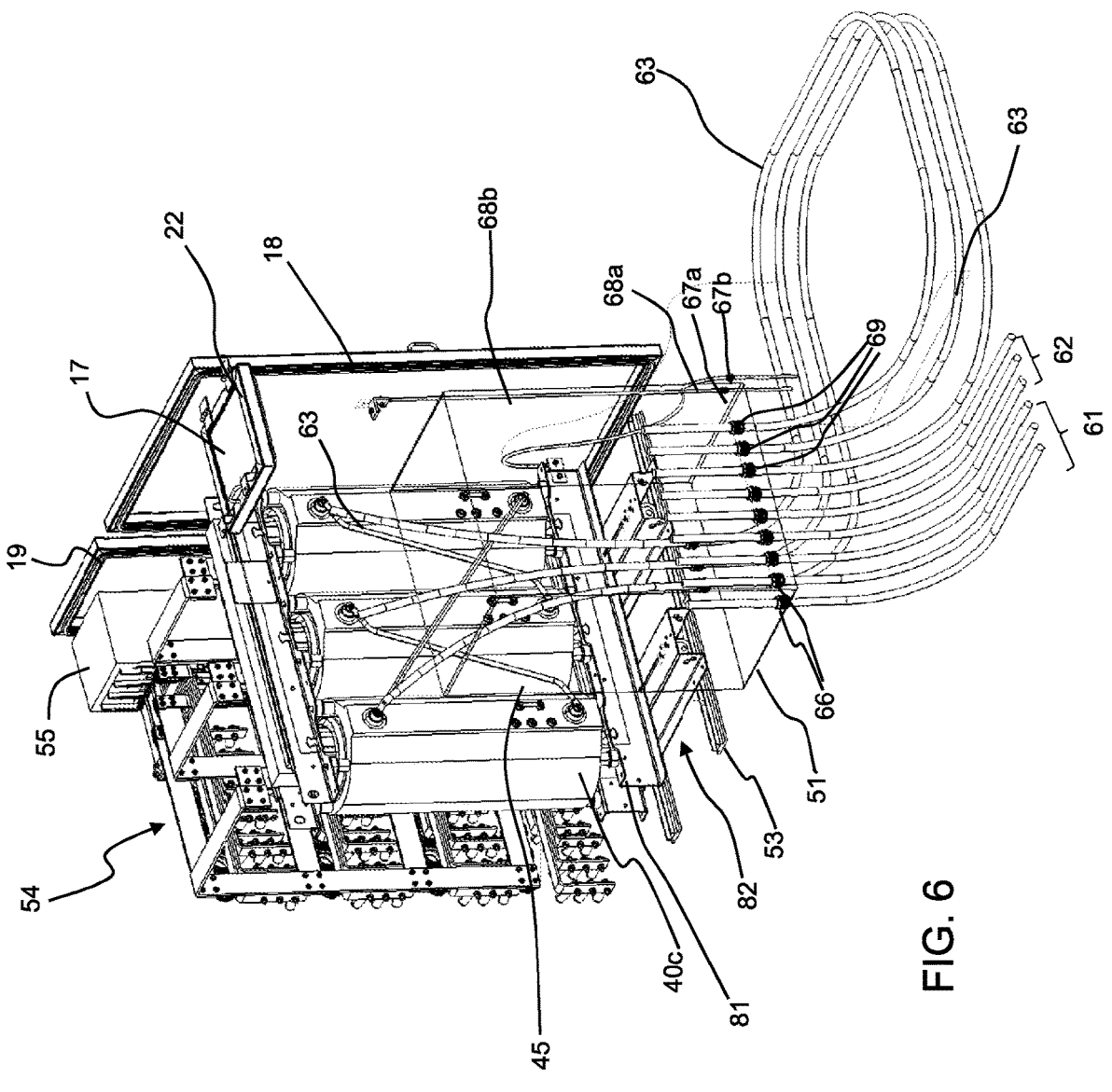
FIG. 6 is a side perspective view of the substation of FIG. 1, the containment box having been removed from the drawing to show some internal details, with the exception of the removable wall sections 18 and 19 on the front wall 11*a* of the box.

FIG. 5 is a rear perspective view of the electrical substation in which the containment box with the frame have been removed to show more clearly the main components comprised in the substation 10 and some details of the equipment. FIG. 6 is a further rear perspective view from the lateral side 11d of the containment box, the box having been removed from the drawing to show more clearly some internal details, with the exception of the removable doors or panels 18 and 19 on the front side 11a of the box.

In the example shown in the figures, a three-phase power transmission system have been considered in relation to the wired connections from/to the electrical transformation substation. However, this example should not be regarded as limiting, the technical characteristics of electricity being regulated by regional or national standards.

A medium-voltage switchgear 51, also referred to in short as MV switchgear, is arranged in the MV box compartment 31, which is depicted in the figures with a parallelepiped-shaped outer casing. The outer casing can be, for example, a metal box intended to be earthed and in which electrical equipment such as switches, control devices for operating switchgear, measuring devices and protective devices are enclosed. In typical implementations, the MV switchgear is sealed in a stainless steel casing using an air, gas (e.g. $SF_6$) or vacuum insulation technology.

The outer casing of the MV switchgear comprises a base that rests on the bottom box wall 11e.

The casing of the MV switchgear 51 is preferably installed on the bottom wall 11e of the containment box 11 of the substation 10. In the usual manner, the MV switchgear may comprise or consist of modular units (or modules). In a secondary substation of a distribution network, the MV switchboard typically comprises a plurality of modules (not shown).

According to common terminology in the field, the types of modules are referred to as module C (line circuit breaker in cable), F (switch-disconnecter with fuse), V (line circuit breaker in vacuum) and M (measurements). In one example, the MV switchgear 51 is a switchgear for ring networks (RMU) with CFV or CCF configuration.

The MV switchgear 51 comprises a plurality of input-output switch modules (C-modules), each input-output module being configured for the input and/or output connection of a medium-voltage cable. The MV switchgear also comprises at least one module configured to direct the current to earth in the event of a fault (V module) in order to prevent damage to the transformer. As an alternative or in addition to at least one V module, the MV switchgear comprises an F module.

Medium-voltage power cables 61, 62 are connected to the MV switchgear 51 for the connection of the substation 10 to the distribution grid. In the illustrated embodiment, the cables 61, 62 are three-phase, whose electrical phases are carried on three separate cables. The energy cables 61 (three cables of different phases) are for connection with a primary or secondary substation upstream of the secondary substation 10, while the energy cables 62 connect the secondary substation 10 with a downstream substation along a primary grid power line.

For the electrical connection between the MV switchgear 51 and the transformer 40, medium-voltage substation energy cables 63 are provided. The three substation cables 63 of different phases are connected to a respective transformer unit 40a, 40b, 40c to provide the medium voltage power to be converted as input (connection per phase). The box cables 63 make the connection to the transformer on the medium voltage side, i.e. on the side of the transformer units facing the MV compartment 31.

With reference to FIG. 6, the MV switchgear 51 shows in transparency the input and/or output of the medium voltage cables 61, 62, 63.

The MV cables 61, 62 enter the electrical substation 10 from below the substation. The MV cables 61, 62 enter the substation 10 from below in an essentially vertical direction, at least in the last section before their connection to the MV switchgear 51. One or more (non-visible) openings on the bottom wall 11e of the containment box 11 allow the entry and exit of the cables.

On the base of the metal casing enclosing the MV switchgear, there is a plurality of through-holes in which respective cable grommets 66 are fixed for the passage of three-phase cables 61, 62 for connection to the input-output switch modules. The plurality of through-holes 66 in the lower surface of the outer casing of the MV switchgear is arranged at one or more (non-visible) openings in the bottom wall 11e of the containment box 11 so as to permit the entry and exit of the cables.

In view of the small interior space of the substation 10, it is preferable that the medium-voltage cables entering and exiting to/from the substation 10, and in particular the substation cables 63 for the connection between the MV switchgear 51 and the transformer 40, do not suffer any bending inside the box, and in particular it is preferable to avoid bending equal to or smaller than the critical bend radius associated with the energy cable used. Preferably, since the reduced internal space in and between the substation compartments 31, 32 makes it complex to straighten energy cables with bend radii greater than the critical bend radius, at least part of the energy cable route from the MV switchgear 51 to the transformer 40 is outside the substation 10.

Each medium voltage power cable 63 has a first end connected to the medium voltage switchgear 51 and a second end connected to a respective phase of the power transformer 40 at the transformer side facing the first box compartment 31.

Each substation MV cable 63 enters the substation from below, through a respective through-hole 69 in the base of the outer casing of the MV switchgear 51 and a corresponding through-hole (not visible) in the bottom box wall 11e to be connected, with its first cable end, to the switchgear 51 at the first box compartment 31. From the MV switchgear 51, the route of the medium-voltage cables 63 runs outside the substation and enters, still from below, through a respective opening in the box bottom wall 11e (not shown) arranged at the second box compartment 32 and is finally connected with its second end to the respective phase of the power transformer 40.

Preferably, the route of the cables 61, 62 entering the MV switchgear 51 is outside the substation 10. As indicated above, the MV energy cables 61, 62 can enter (or exit) the substation through a plurality of openings formed in the bottom wall 11e of the containment box 11 at the positions of the cable grommets 66 on the lower side of the casing of the MV module 51.

The earthing of the MV switchgear 51 can be performed by an earth cable 68a for earthing the MV switchgear 51, the electrical cable 68a running out of the substation 10 through a hole formed on the bottom wall 11e of the box, the hole being provided with a cable grommet 67a. Typically, the main box frame 12 is also earthed via an earthing cable (not shown in the figures).

In the illustrated embodiment, at least one cable shaft 35, 36 is provided below the support surface 25 of the electrical substation 10 to accommodate the MV cables exiting from and/or entering the substation (FIG. 1). A first cable shaft 35 extends below the substation 10 at at least a portion of the MV box compartment 31. The last section of the MV cables 61 and 62 (partially visible) is guided inside the first cable shaft 35 and enters or exits from underneath the substation 10 in a substantially vertical direction with respect to the support plane 25 of the substation 10 through the cable grommets 66 (FIGS. 5 and 6).

A second cable shaft 36 adjacent to and/or communicating with the first cable shaft 35 extends at the MV box and transformer compartments 31, 32 and is configured to accommodate the MV cables 63 connecting the MV switchgear 51 to each transformer unit 40a, 40b and 40c. In the example, the second cable shaft 36 creates a U-shaped path for the MV cables 63, which enables the straightening of cables with a relatively large bend radius.

This configuration allows easy accessibility to the MV cables from outside the substation and facilitates both grid connection operations during commissioning and connection and disconnection operations in the case of transformation substation replacement.

In the example illustrated, the first and second cable shafts 35, 36 are manufactured in the masonry work 37 that serves as the base for the substation 10. A single cable shaft can be provided for housing the MV cables 61, 62 and 63, as illustrated in FIG. 1 where two interconnecting shafts 35, 36 can be seen. The cable shaft(s) have a suitable width, along a transverse direction to the cable straightening direction, and a suitable depth to accommodate the MV cables.

As an alternative to the cable shaft, prefabricated or in-situ cable ducts can be provided (not shown).

In the low-voltage box compartment 33 of the electrical substation 10, a low-voltage (LV) switchgear 55 is arranged, which is electrically connected to the transformer 40. The switchgear 55 comprises a plurality of low voltage input-output switches for electrical connection with low voltage conductors. For example, the circuit breakers are automatic open-type breakers. Typically, the LV switchgear comprises an outer casing in which the circuit breakers are arranged.

Figure 9:
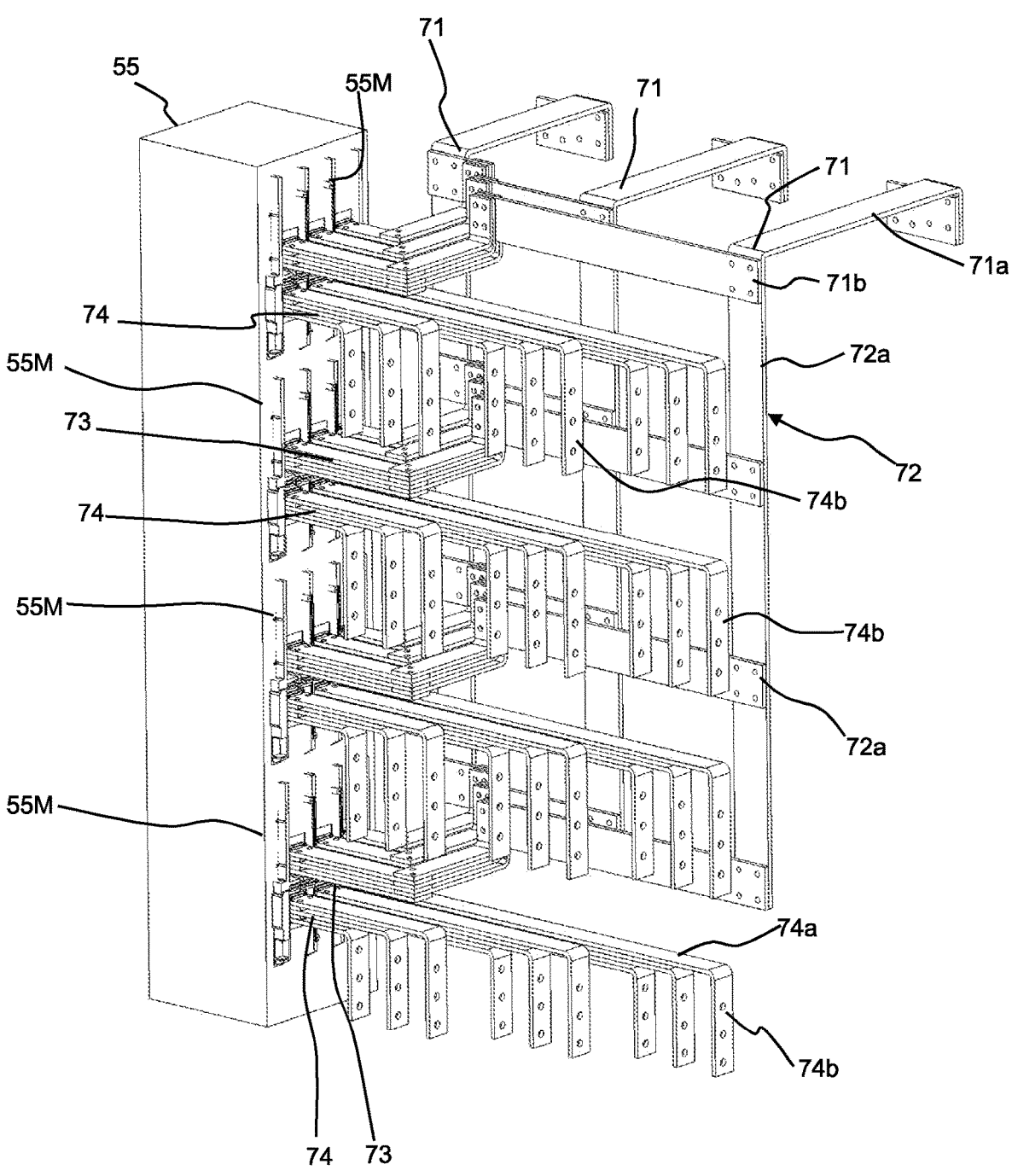

Preferably, LV input and output switches are modular, i.e. they are housed in switch modules. In the non-limiting example shown in the figures, the switchgear comprises four input-output switch modules 55M (FIG. 9).

The LV switchgear 55 may also comprise additional components (not shown in the figures) typically found in a LV switchgear of a transformation substation, such as protective circuit breakers.

Preferably, the transport of low-voltage electrical energy in the substation, i.e. downstream of the transformer 40, is performed by means of an electrical busbar structure, hereafter referred to as busbar structure and in the figures as a whole with reference number 54. The busbar structure comprises a plurality of busbars configured for the transport of low-voltage energy. Busbars are also referred to as bus bars. As is generally known, busbars are rectilinear metal elements, typically made of copper or aluminium and with a rectangular cross-section, which can be fastened directly to each other to form an electrical connection (in the figures, busbar connections are only shown schematically). Busbars can be prefabricated elements of different lengths, typically encapsulated in an insulating material.

In the following, a busbar refers either to an electrical conduit that has a straight element extending in one direction or that extends in more than one direction, e.g. an L- or C-shaped busbar, or to a piece that is made by joining/connecting several portions of a busbar. Furthermore, the different numbering of the busbars in the busbar structure 54 should not be considered limiting but only indicative of the function of the busbar.

Figure 7:
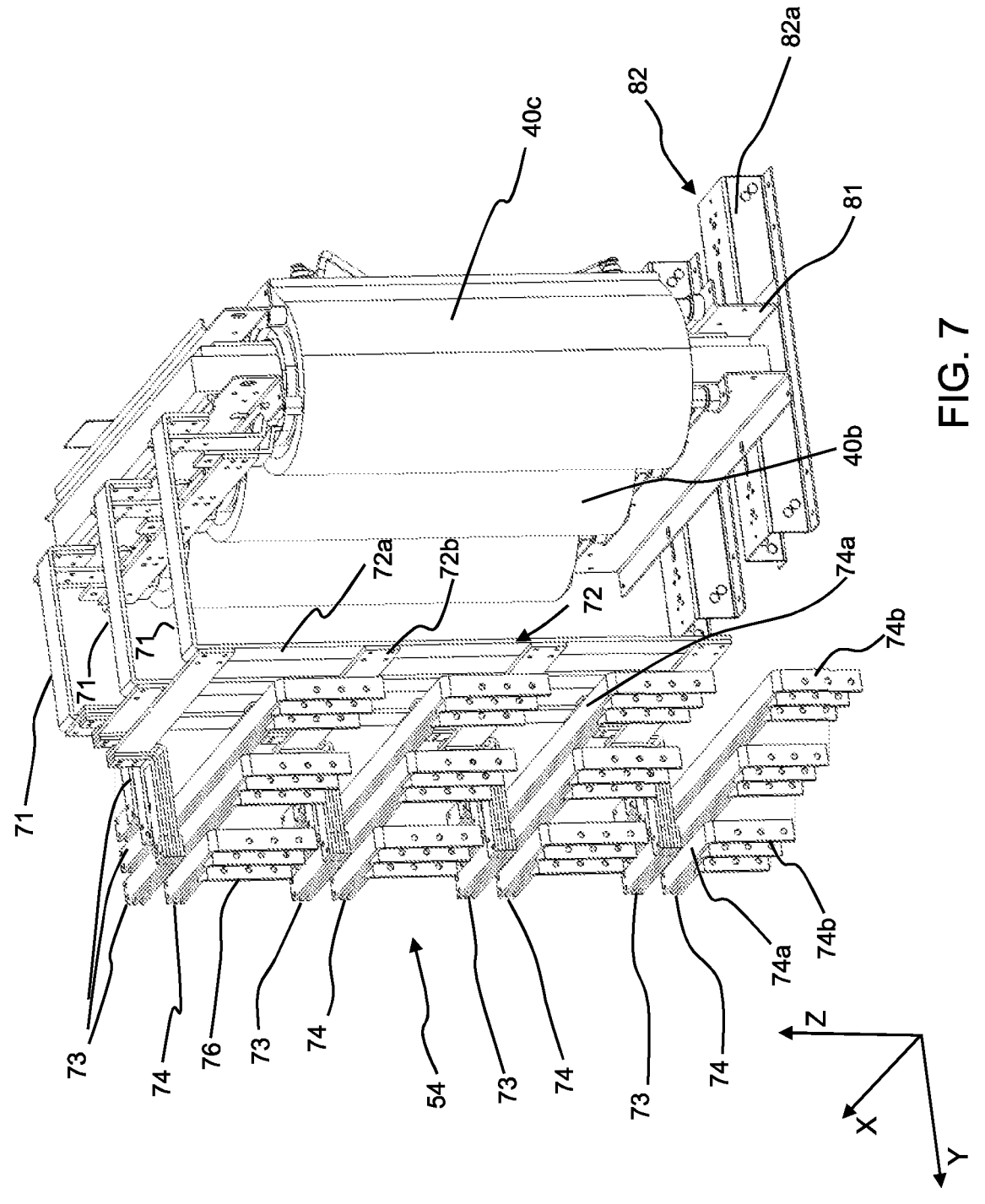
FIG. 7 is a partial perspective view to show the busbar connection from the power transformer in more detail. Elements other than the transformer and the busbar structure have been removed from the drawing.
Figure 8:
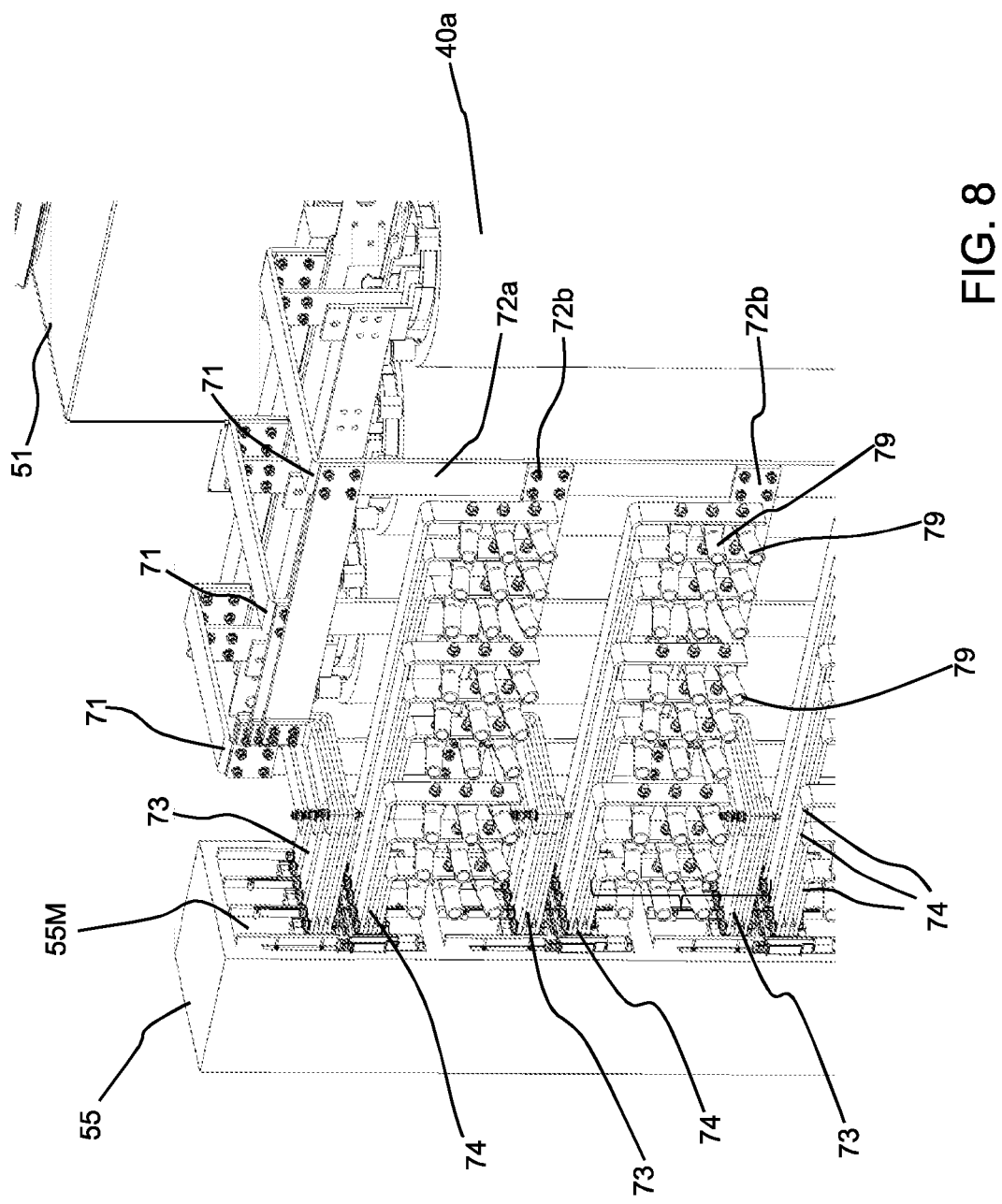
FIGS. 8 and 9 are partial perspective views showing the busbar structure from/to the low-voltage switchgear.

Preferably, the busbar structure 54 is used both for electrical connections from the transformer to the LV switchgear 55 and for connections from the latter to the power cables 57 for low-voltage power lines. FIGS. 7-9 show in greater detail the electrical connections via busbars at the LV substation compartment 33.

A plurality of busbars 71, 73 connect the transformer 40 to the LV switchgear 55 as electrical input connections. Specifically, the electrical connection is phased, and a respective busbar 71 electrically connects each transformer unit 40a-40c to a respective input busbar 73 arranged in the LV box compartment and connected to a respective input switch of the LV switchgear. In the non-limiting example, two busbars 71 are formed by portions of busbar 71a, 71b and one busbar 71 is formed by a single portion.

The busbars 71 connected to the respective transformer unit enter from the transformer box compartment 32 into the LV box compartment 33 through one or more openings (not visible in the figures) formed in the partition wall 29 near the upper box wall 11c.

Preferably, there is a frame 72 arranged in the box compartment 33, the frame being made of non-conductive structural elements. Preferably, the frame 72 is placed close to the partition wall 29, compartment side 33 (not visible in FIG. 3, which for greater clarity only shows the busbars).

The frame 72 comprises vertical rectilinear elements 72b mechanically connected to horizontal rectilinear elements 72a to create a support structure and facilitate the electrical connections, at different heights, of the busbars to the LV switchgear 55. For this purpose, the busbars 73 can run and be constrained to the frame structure 72. The "horizontal" and "vertical" arrangement refers to the layout of the electrical substation when in use.

Respective output busbars 74 are connected to the output switches of each switch module 55M to carry different phase energy for electrical connection to the LV cables.

In the example, the outlet busbars 74 have a downward inverted L-shape (FIG. 9). Each busbar 74 comprises a horizontal portion 74a (horizontal and vertical is to be understood with reference to the layout of the transformation substation 10), which extends in the lateral direction of the substation, and a vertical portion 74b, the vertical portion of the busbar 74b being provided with holes on which lug terminals 79 are fixed for connection to a respective phase of the low voltage energy cable 57 (FIGS. 5 and 8).

Of course, other types of connections between busbars and LV cables 57 are possible. For example, a low-voltage electrical connection can be provided via a single lug terminal that is connected to the three cores of a respective LV cable.

The LV switchgear 55 can be arranged with the front side close to door 19 of the containment box 11 so that it is easily accessible to an operator for maintenance purposes, e.g. when the substation is taken above ground.

The MV switchgear 51 is accessible from the outside through the removable wall section 15 for access/replacement of switch modules and/or MV electrical cables. For example, the MV switchgear can be placed on the bottom wall 11e of the substation box 11 and be moved to the removable wall section when the substation is moved above ground.

Advantageously, the electrical substation 10 can be sized in such a way that it is not necessary for an operator to physically enter the substation compartments when the substation is brought to the surface.

Generally, the MV switchgear 51 and the LV switchgear 55 are built and installed in accordance with national or regional regulations or specific standards.

The electrical substation 10 comprises a supervisory and control system that includes the ordinary functions of control, adjustment/modification of physical devices in the substation, and monitoring by acquisition, control and management of data from/to physical devices and/or in accordance with control signals. In particular, the supervisory and control system is configured to operate switching devices located in the electrical substation, e.g. to change their status (e.g. open-close). The supervisory and control system includes in particular a SCADA (Supervisory Control And Data Acquisition) module.

Preferably, the supervisory and control system is centralised. Preferably, the supervisory and control system comprises a module for receiving and transmitting data remotely and in communication with a telecommunications network. The transceiver module can be located within the SCADA module or in communication with it. The transceiver module can be configured to communicate with a wired telecommunications network, a mobile network (i.e. via radio frequency signals) or a WLAN in communication with a mobile network. Thus, alternatively or additionally, access to and control of substation data can be performed remotely.

Figure 10:
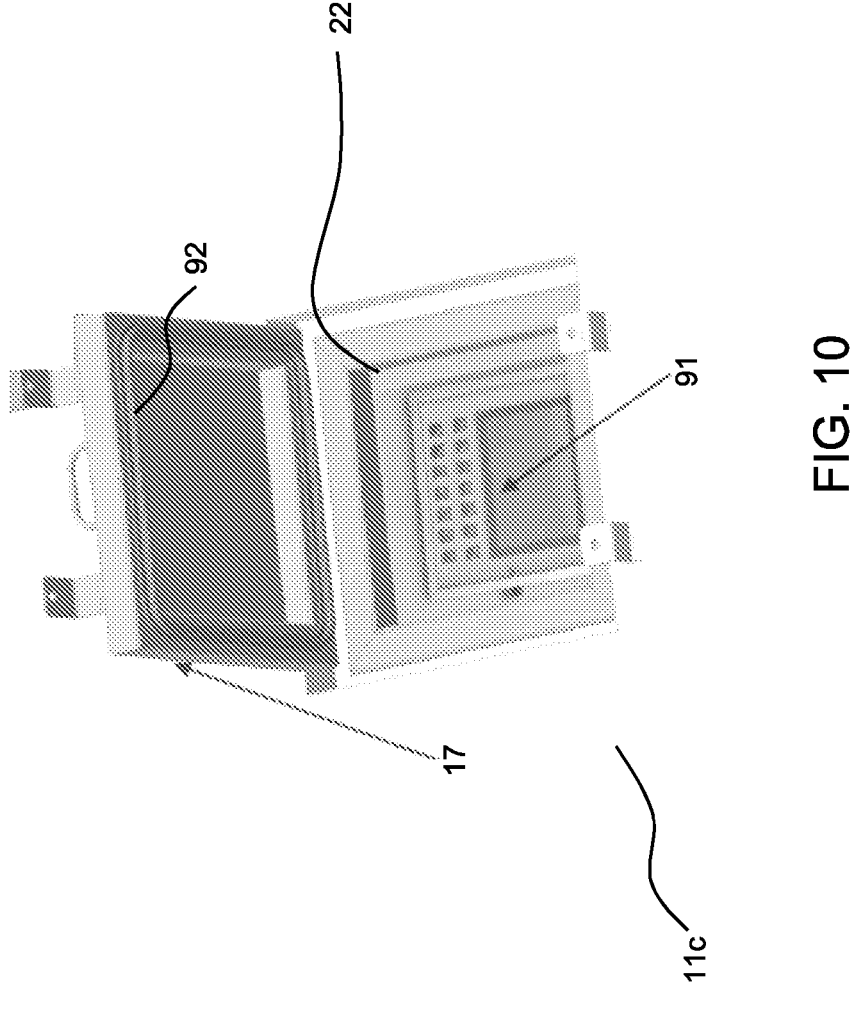
FIG. 10 is a perspective view from above of a portion of the upper side of the containment box to show the control panel.

As indicated above, in a main use, the electrical substation 10 is in communication with the external environment at an upper portion of the box accessible from the outside, which comprises the upper wall 11c of the containment box 11. On the upper wall 11c there is an inspection opening 22 for access to an electronic control panel 91 (FIG. 10) which is in communication with the supervisory and control system of the electrical substation. The control panel 91 is positioned inside the substation 10 at and near the inspection opening 22 so as to be accessible to an operator standing outside the substation.

In an example not shown in the figures, the electronic control panel 91 is housed in a housing with access from above, the housing being fixed to the inside surface of the upper box wall 11c.

The SCADA module and more generally the supervisory and control system is housed in an electronic module 52. The transceiver module, if present, is preferably housed in the electronic module 52. The SCADA module and the transceiver module are not shown in the figures, which schematically show the electronics module.

A cable 68b can be provided for the grounding of the electronics module (FIG. 6, electronics module not shown).

Optionally, the SCADA module is operationally connected with a known distribution network supervisory and management system (ADMS), of which the substation 10 is a part. The ADMS is hierarchically superior to the substation SCADA module and typically interfaces with the electronic module 52 of the substation itself, e.g. via a transceiver module for connection to a mobile or fixed telecommunications network.

The electronics module 52 is operationally connected to the control panel 91. In the usual way, the electronics module 52 is equipped with inputs and outputs for connections to the MV and LV switchgears, the power transformer and any other electrical or electronic equipment in the substation that can be controlled via the control panel 91.

In particular, the electronic control panel 91 can be configured to control the switching apparatus of the MV and LV switchgears (e.g. for performing status changes) and more generally with physical devices present in the substation 10. In the example in the figures, the electronic module 52 is arranged in the MV compartment 31 above the MV switchgear 51 and in the vicinity of the control panel 91 (FIG. 5).

Figure 4:
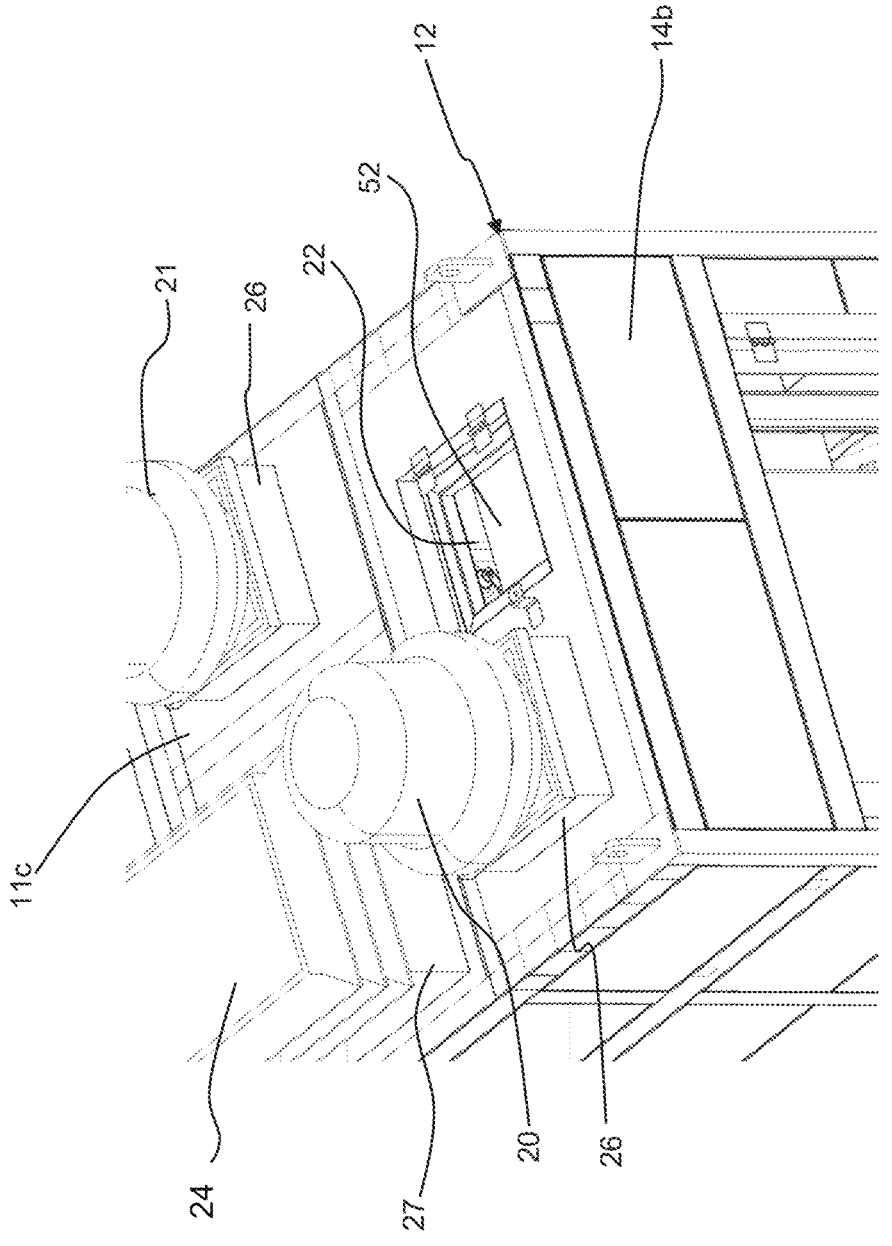
FIG. 4 is a partial side perspective view showing the location of the control panel; the access door to the control panel has been removed to show the space for housing the control panel (not shown).

In FIG. 4, the control panel 91 has been removed and, through the opening 22, the electronics module 52 is visible, which encloses the substation supervisory and control system.

The control panel 91 is protected from the external environment by a cover 17, e.g. a removable panel or a resealable hatch, placed over the inspection opening 22. Preferably, the cover 17 is watertight, e.g. it can be fitted with a sealing gasket 92.

In known ways, the control panel 91 comprises a human-machine interface (HMI) logically linked with one or more user-activated input devices, such as a mouse, keyboard and touch screen, and with one or more displays to show synoptic pages of circuit diagrams, status signals or alarms relating to the equipment in the electrical substation, or measurement signals from sensors and gauges installed in the substation.

Using the HMI interface, an operator can view the electrical substation from the outside, accessing the control panel 91 located at the upper wall 11c of the electrical substation 10 in situ to view operational and operating parameters, and more generally, substation data. Ordinary manoeuvres, such as a change of position of electrical switching apparatus, such as circuit breakers or line disconnectors, to prevent or allow current to flow through low or medium voltage lines, can be controlled and managed via the control panel 91.

If the control and monitoring system comprises a module for receiving and transmitting data remotely and in communication with a telecommunications network, supervision and control of the switching apparatus can be performed remotely.

An electrical power transformer in operation generates heat that must be dissipated. Natural convection cooling systems are often used in traditional underground substations. However, the small volume of the substation 10 in conjunction with a summer climate that can be torrid makes it preferable to provide forced-air cooling that keeps the temperature inside the substation below a certain value, for example below 45° C.

The electrical substation 10 preferably comprises a forced-air cooling system. The cooling system comprises at least two ventilation units arranged at the upper wall 11c of the substation 10 and in communication with the outside environment. In the condition of use, the ventilation units are arranged above ground. The ventilation units comprise a first air inlet 24 and a first air extraction device 21, the first air intake and the first air extraction device being in communication with the inside of the substation 10.

The first air intake 24 and the first air extraction device 21 are arranged on the upper wall 11c of the containment box 11, preferably at the transformer box compartment 32 of the substation 10. In this way, the transformer 40 is under flux during its operation to prevent the equipment from overheating.

In FIG. 3, the first partition wall 28 includes at least one opening 28B (in the figure two openings), which is preferably arranged close to the upper wall. The second partition wall 29 includes at least one opening (not visible in the figure), which is arranged close to the upper box wall 11c.

The partition walls 28, 29 may also include one or more lower openings 28A arranged in a lower portion of one or both partition walls, e.g. near the bottom box wall, for the passage of wires, electrical cables or earthing cables. Although not visible in FIG. 3, the second partition wall 29 may have respective openings in positions corresponding to the openings 28A.

Naturally, the number and size of the openings in the walls are illustrative.

Preferably, the ventilation units comprise or consist of a first and second air intake 24, 23 and a first and second air extraction device 21, 20 for forced ventilation. The second air intake 23 and the second extraction device 20 are arranged at the MV box compartment 31 and the LV compartment 33, respectively. Alternatively, the second air intake 23 is arranged at the LV box compartment 33 and the second extraction device 20 is arranged at the MV compartment 31. In this way, it is possible to maintain an air flow within all the box compartments 31, 32, 33 of the electrical substation 10.

The presence of at least one opening in each of the partition walls 28, 29 makes the passage of air between the compartments of the containment box and thus the ventilation of the same more effective.

The one or more openings in the partition wall 29 can serve both for the purpose of air circulation within the box compartments and for the connection of the busbars from the transformer to the LV box compartment.

Size and number of openings in the partition walls 28, 29 are naturally purely illustrative.

The air intakes 23, 24 and air extraction devices 20, 21 are mounted at respective openings (not shown) formed on the upper wall 11c of the containment box. Each of the air intakes 23, 24 can have a natural outside air supply. The air extraction devices 20, 21 can be air extractors with an axial centrifugal motor.

Advantageously, the cooling system is ductless so as not to occupy space inside the electrical substation.

In a main use of the electrical substation in accordance with this disclosure, the substation is underground and the external surface of the upper box wall 11c of the containment box 11 is accessible from the outside for cooling the equipment arranged inside it and/or for the access to the electronic control panel and thus the control of the equipment.

In situations where it is desired for the electrical substation to occupy a small footprint in the external environment, e.g. in a highly urbanised context, it is preferable for the substation to be completely underground so that the upper box wall 11c is at ground or road surface level, generally at the above-ground level.

Preferably, the first and second air extraction devices 20, 21 and the first and second air intakes 24, 23 have a vertical extension (Z-axis) such that the section of each ventilation unit that is configured for the passage of incoming or outgoing air is elevated above ground level so as to prevent any entry of flowing water (at ground level). Preferably, each ventilation unit 20, 21, 23, 24 is arranged on the upper wall of the containment box 11 in such a way that the air passage section of the ventilation unit is at a height of at least 10 cm, e.g. between 10 and 20 cm.

For this purpose, air intakes 23, 24 and air extraction devices 20, 21 are preferably mounted on respective vertical spacers 26, 27. The vertical spacers are constructed with a hollow interior to allow air flow through the respective openings on the upper wall.

Preferably, the ventilation units are constructed to prevent the entry of rainwater (from above). In the embodiment of the figures, the air extraction devices 20, 21 comprise a circular crown facing downwards.

Preferably, the air intakes 23, 24 are air intakes with gravity flaps, facing downwards so as to prevent the entry of rainwater.

The electrical substation in accordance with this disclosure allows for a significant reduction in its overall dimensions.

The overall dimensions of the box, i.e. of the substation except for the air intakes and extractor fans located on the outside, on the upper wall of the box, is preferably between 12 and 15 m³.

Preferably, the footprint area, L×W, is comprised between 5 and 7 m².

In one example, the dimensions of the box 11 are L=3070 mm, W=2050 mm and H=2296 mm, with an overall substation volume of approximately 14.4 m³.

For example, the MV and LV compartments have a respective length of 1000 mm and the transformer compartment has a length of 1070 mm.

These dimensions may be suitable for a transformer power of 2000 kVA, e.g. for 20 kV distribution networks.

In another example, for a transformer power of 630 kVA, the dimensions of the box 11 are L=2870 mm, W=1850 mm and H=2296 mm, with an overall volume of approximately 12 m³.

The person skilled in the art will recognise that it is possible to combine the various characteristics of the embodiments described above to obtain further embodiments, all falling within the scope of the present invention as defined by the subsequent claims.

What is claimed is:

1. An electrical transformation substation comprising:

a containment box extending along a longitudinal direction and comprising a first box compartment, a second box compartment and a third box compartment, wherein the first, second and third box compartments each define a respective compartment and are arranged adjacent to one another in the longitudinal direction when the electrical transformation substation is in a position of use, the second box compartment being arranged between the first and third box compartments;

a first-voltage switchgear having a first-voltage power and arranged in the first box compartment;

an electrical power transformer configured to convert the first-voltage power into a second-voltage power lower than the first-voltage power and arranged in the second box compartment, and a second-voltage switchgear having the second-voltage power and arranged in the third box compartment, wherein the containment box comprises a box bottom wall which, in the position of use lies on a support surface, a box upper wall opposite the box bottom wall, a first and second box side walls opposite to one another, a box front wall and a box rear wall opposite the box front wall, and the first box side wall and the second box side wall laterally delimit the first box compartment and the third box compartment, respectively, wherein the electrical transformation substation further comprises an electronic control panel positioned within the electrical transformation substation at one of the first, second and third box compartments, wherein, in the position of use of the electrical transformation substation, the box upper wall is accessible from an outside of the electrical transformation substation and comprises an inspection opening and the electronic control panel is arranged at and near the inspection opening so as to be accessible from the outside through the inspection opening.

2. The electrical transformation substation in accordance with claim 1, wherein the first and third box compartments are separated from the second box compartment by respective first and second partition walls extending vertically with respect to the box bottom wall.

3. The electrical transformation substation according to claim 1, wherein the box front wall comprises a first removable wall section at the second box compartment and the first box side wall or the box front wall comprises a second removable wall section to access the first box compartment, the electrical transformation substation further comprising a third removable wall section arranged on the box front wall at the third box compartment or on the second box side wall, the first, second and third removable wall section being watertight when in a respective closed position.

4. The electrical transformation substation in accordance with claim 1, wherein the electronic control panel is operatively connected to a supervisory and control system of substation data comprising data relating to an operation and functioning of the first-voltage switchgear, the second-voltage switchgear and the electrical power transformer, the electronic control panel comprising a human-machine interface configured to display the substation data and/or to enter commands executable by the supervisory and control system.

5. The electrical transformation substation in accordance with claim 1, wherein the inspection opening is provided with a protective cover removable or that can be opened, the protective cover being watertight when in a closed position of the inspection opening.

6. The electrical transformation substation in accordance with claim 1, further comprising a forced-air cooling system comprising a first air intake and a first air extraction device, the first air intake and the first air extraction device being arranged on the outside of the electrical transformation substation on the box upper wall and in communication with an inside of the containment box.

7. The electrical transformation substation in accordance with claim 6, wherein the first air intake and the first air extraction device are arranged at respective openings formed in the box upper wall at the second box compartment.

8. The electrical transformation substation in accordance with claim 6, wherein the forced-air cooling system comprises a second air intake and a second air extraction device which are arranged on the outside of the electrical transformation substation on the box upper wall, the second air intake and second air extraction device at respective openings in the box upper wall, wherein the second air intake is arranged at the first box compartment or the third box compartment and the second extraction device is arranged at the third box compartment if the second air intake is arranged at the first box compartment or at the first box compartment if the second air intake is arranged at the third box compartment.

9. The electrical transformation substation in accordance with claim 1, wherein the second-voltage switchgear comprises a plurality of second-voltage input-output switches and the electrical power transformer is electrically connected to the plurality of second-voltage input-output switches by means of a busbar structure configured to transport the second-voltage power, and wherein the busbar structure comprises a plurality of input busbars connected to respective inputs of the plurality of second-voltage input-output switches and a respective plurality of output busbars connected to respective outputs of said plurality of second-voltage input-output switches.

10. The electrical transformation substation in accordance with claim 9, wherein the second box side wall is provided with a plurality of through-holes designed for inserting second-voltage energy cables for a connection to busbars of the plurality of output busbars.

11. The electrical transformation substation in accordance with claim 1, wherein the first and third box compartments are separated from the second box compartment by respective first and second partition walls extending vertically with respect to the box bottom wall so as to separate the first and second box compartments from each other and second and third box compartments from each other, and each of the first and the second partition walls includes one or more openings.

12. The electrical transformation substation in accordance with claim 1, wherein the first-voltage switchgear is arranged on the box bottom wall at the first box compartment and the box bottom wall comprises respective two or more through-holes configured for a passage of respective first-voltage energy cables from the outside of the electrical transformation substation and from below with respect to the box bottom wall for a connection with the first-voltage switchgear.

13. The electrical transformation substation in accordance with claim 1, wherein at least one substation first-voltage cable connects the first-voltage switchgear to the electrical power transformer at a side of the electrical power transformer facing the first box compartment and wherein the at least one substation first-voltage cable has a first cable end and a second cable end, the first cable end being connected to the first-voltage switchgear and the second cable end being connected to the power transformer.

14. The electrical transformation substation in accordance with claim 13, wherein:

the at least one substation first-voltage cable passes through a respective at least one through-hole formed in the box bottom wall at the first box compartment for a connection of the first cable end with the first-voltage switchgear, and the at least one substation first-voltage cable exits from below the box bottom wall and has a path that runs on the outside of the electrical transformation substation to enter the electrical transformation substation again from below through an opening in the box bottom wall arranged at the second box compartment to enter the electrical transformation substation and connect the second cable end of the substation first-voltage cable to the electrical power transformer.

15. An electrical transformation substation comprising:

a containment box extending along a longitudinal direction and comprising a first box compartment, a second box compartment and a third box compartment, wherein the first, second and third box compartments each define a respective compartment and are arranged adjacent to one another in the longitudinal direction when the electrical transformation substation is in a position of use, the second box compartment being arranged between the first and third box compartments;

a first-voltage switchgear having a first-voltage power and arranged in the first box compartment;

an electrical power transformer configured to convert the first-voltage power into a second-voltage power lower than the first-voltage power and arranged in the second box compartment, a second-voltage switchgear having the second-voltage power and arranged in the third box compartment, wherein the containment box comprises a box bottom wall which, in the position of use lies on a support surface, a box upper wall opposite the box bottom wall, a first and second box side walls opposite to one another, a box front wall and a box rear wall opposite the box front wall, and the first box side wall and the second box side wall laterally delimit the first box compartment and the third box compartment, respectively, and a forced-air cooling system comprising:

a first air intake and a first air extraction device being arranged on an outside of the electrical transformation substation on the box upper wall and in communication with an inside of the containment box, the first air intake and the first air extraction device are arranged at respective openings formed in the box upper wall at the second box compartment, and a second air intake and a second air extraction device being arranged on the outside of the electrical transformation substation on the box upper wall, the second air intake and second air extraction device at respective openings in the box upper wall, wherein the second air intake is arranged at the first box compartment or the third box compartment and the second extraction device is arranged at the third box compartment if the second air intake is arranged at the first box compartment or at the first box compartment if the second air intake is arranged at the third box compartment.

* * * * *